INVENTOR.
Edwin S. Hall.

Patented Oct. 7, 1941

2,258,138

UNITED STATES PATENT OFFICE 2,258,138

WABBLER MECHANISM

Edwin S. Hall, Farmington, Conn.

Application February 13, 1939, Serial No. 256,071

20 Claims. (Cl. 74—60)

This invention relates to mechanism for the interconversion of piston reciprocation and shaft rotation in engines and pumps of the class having cylinders parallel to the shaft. The object of the invention is to provide improvements in wabbler mechanisms. This application is a continuation in part of my copending application Ser. No. 70,216 filed March 23, 1936.

In discussing parallel cylinder mechanisms, it is convenient to distinguish between a swashplate and a wabbler. Both are plate-like structures concentric with and inclined to the shaft. The swashplate is a rotating member ordinarily fixed on the shaft. The wabbler does not rotate, being mounted on bearings either on a Z-crankshaft or on swashplate means fixed upon a straight shaft. Ball or roller bearings may be used but it is recognized that fluid film lubricated bearings can be equally efficient, less expensive, and more durable. An object of this invention is to provide fluid film lubricated wabbler bearings of improved construction.

Film lubrication in a journal bearing, with the journal assuming an eccentric position in the bearing and the oil-wedge forming between converging cylindrical surfaces, is well-known. This condition occurs best when the load is normal to the journal. But the loading on a wabbler bearing is not normal to the wabbler axis, but includes an overturning couple or moment, and when journal bearings are used on a Z-crank, this cantilever loading tends to cock the journal bearings, producing concentrated loads at the ends of the journal instead of the circumferential wedge of oil distributed uniformly the whole length of the bearing which is necessary for efficient film lubrication.

Film lubrication in a plain collar thrust bearing, axially loaded, is not possible because no oil-wedge can form between parallel surfaces, wherefore the plain collar thrust bearing cannot carry heavy loads efficiently. But when a wabbler is mounted on a swashplate of correct design, the structure, while similar in appearance to a plain collar thrust bearing, functions quite differently. The loading is not purely axial, but includes the aforesaid overturning couple or moment which operates to distribute the clearance between the wabbler and the swashplate so that the surfaces are not parallel but converging in the direction of motion, making it possible for oil-wedge films to form in the same way they form in a normally loaded journal bearing.

In short, wabbler loading, especially in a normal parallel engine having working cylinders at both ends, is such that it interferes with efficient film lubrication in journal bearings on a Z-crank but makes possible efficient film lubrication in a collar type thrust bearing comprising a wabbler-swashplate combination. The desired conditions for film lubrication between a wabbler and swashplate are facilitated by piloting the wabbler on a spherical boss of the swashplate, such a boss permitting the wabbler to swing into proper position relative to the working surfaces of both swashplate and wabbler and the clearances between them.

An object of this invention is to provide improved constructions for swashplates and wabblers to promote fluid film lubrication between their coacting surfaces. Another object is to provide a swashplate relatively inexpensive to manufacture and capable of being conveniently machined all over and conveniently attachable to a straight shaft.

Briefly described, the invention consists of a swashplate means fixed upon the shaft with a wabbler operably mounted on the swashplate means in such a manner as to promote fluid film lubrication between them. Two inversions of the mechanism may be used: that in which the swashplate is a single member between two parts of the wabbler; and that in which the wabbler is a single member between two parts of the swashplate.

In the former type, the swashplate has working surfaces which are surfaces of revolution relative to the swashplate axis, and a central spherical boss thru which the shaft passes, the axis of the shaft being inclined relative to the swashplate axis and the center of the sphere being at the intersection of the two axes. The hole thru the boss and the facings at the ends of the hole can be easily machined relative to the axis of the hole, coinciding with the shaft axis. The outer surfaces of the swashplate including the spherical boss can be readily machined relative to the swashplate axis. The spherical boss may also serve as a pilot for the wabbler, taking the radial loading, and permitting the wabbler to swing readily into proper position for the best distribution of the working clearance to promote film lubrication between the swashplate and wabbler surfaces, made possible by the turning couple character of the wabbler loading. The wabbler comprises two halves, held together in any suitable manner. Oil shields may be provided to catch the leakage from around the boss.

In the alternate type, the wabbler is a single member, mounted on a spherical boss clamped between two swashplate members on the shaft. With this construction, oil shields are necessary to maintain flooded lubrication in the wabbler bearings.

With either type of swashplate and wabbler construction, the working surfaces may be either plane, spherical, or conical; and the bearings may be either plain bearings or slipper bearings. If slipper bearings are used, film lubrication is dependent upon the position of the slippers relative to the swashplate surfaces, rather than by the position of the entire wabbler relative to the swashplate.

Further features and objects of the invention will be apparent from the following description in connection with the drawing, in which.

Figure 1:
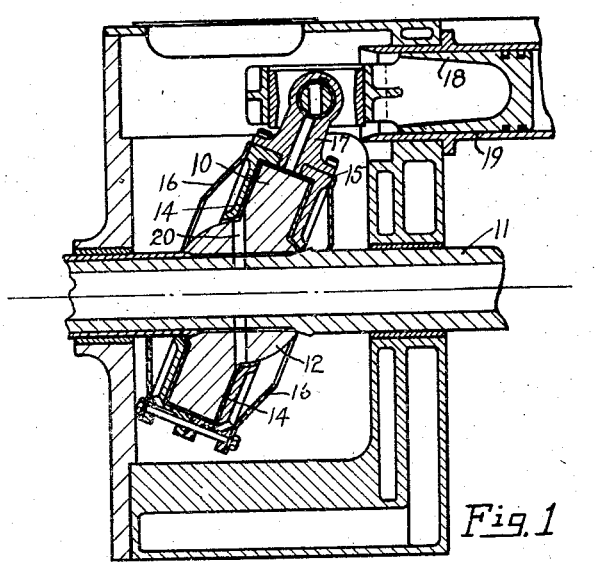
Fig. 1 is a longitudinal section thru a wabbler mechanism having plane bearing surfaces.
Figure 2:
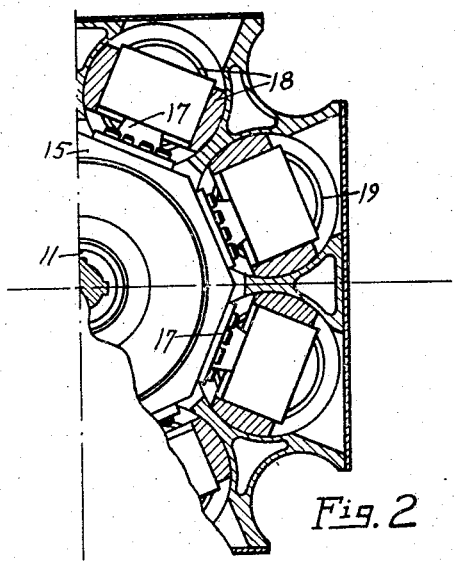
Fig. 2 is a transverse section of the mechanism shown in Fig. 1.

Referring to the drawing, in Figs. 1 and 2, swashplate 10 is fastened on shaft 11 by splines and conical wedges in a well-known manner. Swashplate 10 has a central spherical boss 12 and plane working faces 13 and 14. Wabbler 15 is mounted on swashplate 10 and is provided with bearing surfaces coacting with boss 12 and working faces 13 of the swashplate. Wabbler 15 is in two parts, with swashplate 10 between them. Oil shields 16 may be provided on wabbler 15. Wabbler arm 17 and accompanying parts serve to operably connect wabbler 15 to piston member 18 reciprocable in cylinder 19 parallel to shaft 11. Oil is forced by any suitable means into hollow shaft 11, and thence by holes 20 to the working clearance between swashplate 10 and wabbler 15, and thence thru passages in wabbler arms 17 to the other working parts.

Figures 3, 7:
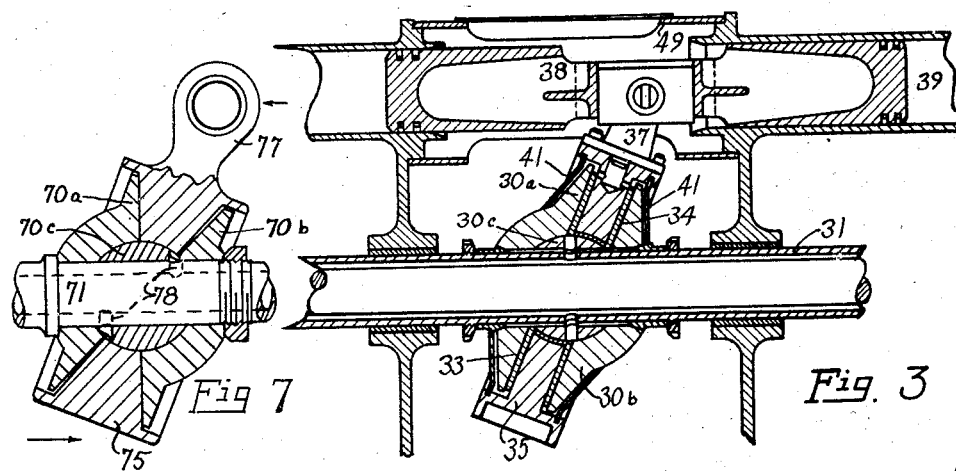
Fig. 3 is a longitudinal section thru a wabbler and swashplate mechanism, substantially the inversion of that shown in Fig. 1.
Fig. 7 is a longitudinal section thru a wabbler and swashplate combination of similar type to that of Fig. 3, but having conical bearing surfaces instead of plane.

In Fig. 3, swashplate member 30 comprises two similar parts 30a and 30b with spherical boss 30c clamped between them on shaft 31 in any suitable manner. Wabbler 35 is piloted on spherical boss 30c and has plane bearing surfaces operably engaging the plane faces 33 and 34 of swashplate 30. Wabbler arm 37 and accompanying parts serve to connect wabbler 35 to piston member 38 reciprocable in cylinders 39 and connecting crosshead guide surface 49, coaxial with cylinders 39 and parallel to shaft 31. Oil is forced by any suitable means into the annular space in shaft 31, and thence by suitable passages to the working clearance between swashplate 30 and wabbler 35. Oil shields 41 together with the centrifugal action of swashplate member 30 combine to assist in the maintenance of an oil bath in the working clearance between swashplate 30 and wabbler 35.

Figure 4:
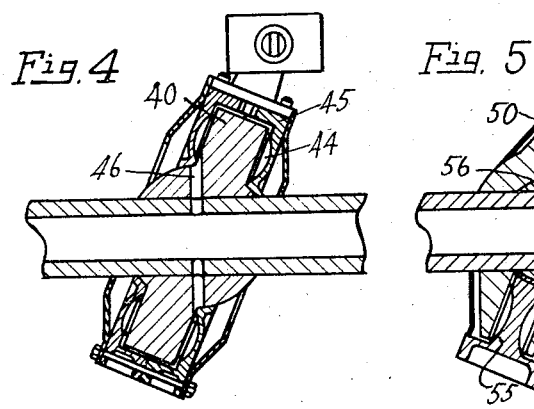
Fig. 4 is a longitudinal section thru a wabbler and swashplate combination similar to that of Fig. 1, with pivoted slipper bearings.

The structure shown in Fig. 4 is similar to that of Fig. 1 except that slippers 44 are seated in pivot cups in wabbler 45 and have plane bearing faces operably engaging the plane working faces of swashplate 40. Oil holes 46 are provided to carry oil from the interior of the shaft to the space between swashplate 40 and wabbler 45 in which slippers 44 operate, so that the slippers 44 may always be immersed in an oil bath.

Figure 5:
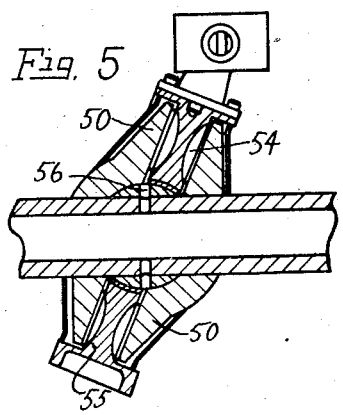
Fig. 5 is a longitudinal section thru a wabbler and swashplate combination similar to that of Fig. 3, with pivoted slipper bearings.

The structure shown in Fig. 5 is similar to that of Fig. 3 except that slippers 54 are seated in pivot cups in wabbler 55 and have plane bearing faces operably engaging the plane working faces of swashplate 50. Oil holes 56 are provided to carry oil from the interior of the shaft to the space between swashplate 50 and wabbler 55 in which slippers 54 operate, so that the slippers 54 may always be immersed in an oil bath.

Figure 6:
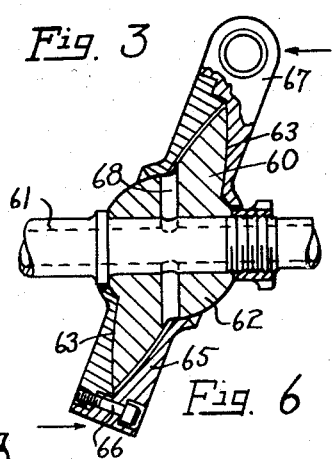
Fig. 6 is a longitudinal section thru a wabbler and swashplate combination of similar type to that of Fig. 1, but having spherical bearing surfaces instead of plane.

In Fig. 6, swashplate 60 is fixed on shaft 61 in any suitable manner, the shaft passing thru central spherical boss 62 of swashplate 60. Working faces 63 of swashplate 60 are spherical and coact with similar spherical bearing faces of wabbler 65 which comprises two members held together embracing swashplate 60 in any suitable manner as by bolts 66. Wabbler 65 has arms 67 for operable connection with piston members in a similar manner to those shown in Figs. 1 and 3. Oil holes 68 serve to lead oil from hollow shaft 61 to the working clearance between swashplate 60 and wabbler 65, the entrance of oil into this clearance space being at unloaded regions, as shown in an exaggerated manner.

In Fig. 7, swashplate member 70 comprises two similar parts 70a and 70b with spherical boss 70c clamped between them on shaft 71 in any suitable manner. Wabbler 75 is piloted on spherical boss 70c and has conical bearing surfaces operably engaging the conical working faces of swashplate members 70a and 70b. Wabbler 75 has arms 77 for operable connection with piston members in a similar manner to those shown in Figs. 1 and 3. Oil holes 78 serve to lead oil from hollow shaft 71 to the working clearance between swashplate 70 and wabbler 75, the entrance of oil into this clearance space being at unloaded regions, as shown in an exaggerated manner.

In operation, since the loading found in a wabbler mechanism as a result of piston action produces a couple or moment as indicated by the arrows in Fig. 6 or 7, tending to overturn the wabbler. This action is resisted by the swashplate. The loaded area of the swashplate is on the portions of the working surfaces which lean toward the shaft. The wabbler, being piloted on a spherical boss, bears heavily against these nearer portions of the swashplate surfaces, leaving the opposite portions free, as indicated in Figs. 6 and 7. It is therefore obvious that each annular swashplate working surface, with its corresponding wabbler bearing area, if developed, would show convergence and divergence of the surfaces similar to that well-known in a journal bearing. Since oil bathes the parts at all times, being constantly supplied under pressure, oil can readily enter where the surfaces are not loaded, and be dragged into the converging space, to form oil-wedge film lubrication exactly as in a journal bearing.

While the foregoing relative positioning of the swashplate and wabbler is not essential when slippers are used as in Figs. 4 and 5, the pivoting of the wabbler on the spherical boss portion of the swashplate is decidedly helpful in the process of transferring the loading from one slipper to the next as the swashplate turns.

It is obvious also that swashplate members of any of the types shown may be completely machined without any difficulty. The hole thru the boss and the facing around the ends thereof is readily machined relative to the shaft axis, while the outer surface of the boss and the working faces are easily machined relative to the swashplate axis. The spherical boss also provides the axial length of hole necessary to permit enough length of key or splines to transmit the torque to the shaft, without unduly high loading.

While spherical working faces of the type shown in Fig. 6, and conical working faces as shown in Fig. 7, in either inversion of the mechanism, are self-centering, it is not absolutely necessary that the spherical boss be provided. It is however much better that the spherical boss pilot the wabbler and take its radial loading, to permit the wabbler to assume its optimum position relative to the swashplate, even tho the working clearances should be excessive as indicated in Figs. 6 and 7.

Having thus described the invention, it is obvious that the objects thereof have been attained. While specific embodiments of the invention have been shown and described, it is understood that changes may be made in the construction and in the arrangement of the various parts, without departing from the spirit or scope of the following claims.

I claim:

1. In mechanism of the class described, a shaft, swashplate means fixed on said shaft, a pair of plane working surfaces on said swashplate means and a spherical pilot surface associated with said working surfaces, a wabbler, bearing elements carried by said wabbler and operably conforming to said plane and spherical swashplate surfaces, said wabbler being substantially U-shaped in section to contain an oil bath for flooded lubrication of said bearing elements.

2. In mechanism of the class described, a shaft, swashplate means fixed on said shaft, plane working surfaces on said swashplate means and a spherical pilot surface on said swashplate means surrounding said shaft, a wabbler piloted on said spherical pilot surface, bearing slippers pivoted in said wabbler in operable relationship with said plane working surfaces, said wabbler being substantially U-shaped in section to contain an oil bath for the flooded lubrication of said bearing slippers.

3. In a wabbler mechanism, a straight shaft, swashplate means fixed upon said shaft with the axis of said means inclined to and intersecting the axis of said shaft, plane working surfaces on said swashplate means said surfaces being normal to the axis of said swashplate means, a substantially spherical boss associated with said swashplate means with its center at the intersection of said axes, said shaft passing thru said boss, a wabbler operably associated with said swashplate means, and means for maintaining lubricant between said swashplate means and said wabbler.

4. In a wabbler mechanism, a straight shaft, swashplate means fixed upon said shaft with the axis of said means inclined to and intersecting the axis of said shaft, spherical working surfaces on said swashplate means, a substantially spherical boss associated with said swashplate means with its center at the intersection of said axes, said shaft passing thru said boss, a wabbler operably associated with said swashplate means, and means for maintaining lubricant between said swashplate means and said wabbler.

5. In a wabbler mechanism, a straight shaft, swashplate means fixed upon said shaft with the axis of said means inclined to and intersecting the axis of said shaft, conical working surfaces on said swashplate means, a boss associated with said swashplate means with its center at the intersection of said axes, said shaft passing thru said boss, a wabbler operably associated with said swashplate means, and means for maintaining lubricant between said swashplate means and said wabbler.

6. In a wabbler mechanism, a straight shaft, swashplate means fixed upon said shaft with the axis of said means inclined to and intersecting the axis of said shaft, conical working surfaces on said swashplate means, the conical axes coinciding with the axis of said swashplate means, a wabbler operably associated with said swashplate means, bearing surfaces on said wabbler coacting with said conical working surfaces, and means for maintaining the working clearance between said bearing surfaces and said conical working surfaces full of oil during operation of said mechanism.

7. In a wabbler mechanism, a straight shaft, swashplate means fixed upon said shaft with the axis of said means inclined to and intersecting the axis of said shaft, working surfaces on said swashplate means said surfaces being surfaces of revolution relative to the axis of said swashplate means, a substantially spherical boss associated with said swashplate means with its center at the intersection of said axes, said shaft passing thru said boss, a wabbler operably mounted on said swashplate means, slippers pivoted in said wabbler and operably engaging said swashplate working surfaces, and means for maintaining the clearance between said swashplate means and said wabbler full of lubricant during operation of said mechanism.

8. In mechanism of the class described, in combination, a straight shaft, swashplate means fixed upon said shaft and rotatable therewith, the exterior surfaces of said swashplate means being surfaces of revolution relative to an axis inclined to and intersecting the axis of said shaft, said surfaces including a spherical surface centering at the intersection of said axes and working surfaces substantially normal to said inclined axis, a wabbler piloted on said spherical surface, bearing means on said wabbler operably engaging said working surfaces to support thrust components of wabbler loading thereon, and means for leading oil into the working clearance between said swashplate working surfaces and said wabbler bearing means.

9. In mechanism of the class described, in combination, a straight shaft, swashplate means fixed upon said shaft and rotatable therewith, the exterior surfaces of said swashplate means being surfaces of revolution relative to an axis inclined to and intersecting the axis of said shaft, said surfaces including working surfaces substantially normal to said inclined axis, a wabbler rotatable relative to said swashplate means, bearing means on said wabbler operably engaging said swashplate working surfaces, the loading on said wabbler comprising a couple tending to rotate said wabbler substantially about the intersection of said axes to cause rotation of said swashplate means and said shaft, and conduits for leading oil into the working clearance between said swashplate working surfaces and said wabbler bearing means at areas opposite to those loaded by said couple.

10. In a wabbler mechanism, in combination, a straight shaft, a swashplate fixed upon said shaft and rotatable therewith, the axis of said swashplate inclined to and intersecting the axis of said shaft, working surfaces on said swashplate said surfaces being surfaces of revolution about and substantially normal to the axis of said swashplate, a central spherical boss on said swashplate with its center at the intersection of said axes, a wabbler comprising two similar parts piloted on said boss and enclosing said swashplate and operably engaging said working surfaces, and means for maintaining the working clearance between said wabbler and said swashplate full of oil.

11. In a wabbler mechanism, in combination, a straight shaft, swashplate means comprising two similar parts fixed upon said shaft and a spherical boss between them, the axis of said swashplate means inclined to and intersecting the axis of said shaft at the center of said spherical boss, working surfaces on said swashplate means said surfaces being surfaces of revolution about and substantially normal to the axis of said swashplate means, a wabbler piloted on said boss between the two similar parts of said swashplate means, bearing means on said wabbler operably engaging said working surfaces of said swashplate means, and means for maintaining said bearing means flooded with oil during operation of said mechanism.

12. In a wabbler mechanism, in combination, a straight shaft, a swashplate fixed upon said shaft and rotatable therewith, the axis of said swashplate inclined to and intersecting the axis of said shaft, plane working surfaces on said swashplate and normal to the axis thereof, a central spherical boss on said swashplate with its center at the intersection of said axes, a wabbler comprising two similar parts piloted on said boss and enclosing said swashplate and operably engaging said working surfaces, and means for leading oil into the working clearance between said swashplate working surfaces and said wabbler.

13. In a wabbler mechanism, in combination, a straight shaft, swashplate means comprising two similar parts fixed upon said shaft and a spherical boss between them, the axis of said swashplate means inclined to and intersecting the axis of said shaft at the center of said spherical boss, plane working surfaces on said swashplate means said surfaces being normal to said inclined axis, a wabbler piloted on said spherical boss between the two similar parts of said swashplate means, bearing means on said wabbler operably engaging said plane working surfaces of said swashplate means, and means for maintaining said bearing means flooded with oil during operation of said mechanism.

14. In combination with a straight shaft, swashplate means inclined to and fixed upon and rotating with said shaft, all surfaces of said swashplate means except those resisting relative rotation thereof on said shaft being surfaces of revolution relative either to the inclined axis of said swashplate means or to the axis of said shaft or to both, a wabbler operably mounted with suitable working clearance upon said swashplate means, and means for introducing oil in the regions in said clearance which are normally unloaded during operation and for maintaining said clearance full of oil.

15. Structure as claimed in claim 8 in which said working surfaces are plane and normal to said inclined axis.

16. Structure as claimed in claim 8 in which said working surfaces are spherical and non-concentric their centers on said inclined axis.

17. Structure as claimed in claim 8 in which said working surfaces are conical.

18. Structure as claimed in claim 9 in which said working surfaces are plane and normal to said inclined axis.

19. Structure as claimed in claim 9 in which said working surfaces are spherical and non-concentric their centers on said inclined axis.

20. Structure as claimed in claim 9 in which said working surfaces are conical, the axes of the cones coinciding with said inclined axis.

EDWIN S. HALL.